US009391650B2

(12) United States Patent
Aparin

(10) Patent No.: US 9,391,650 B2
(45) Date of Patent: Jul. 12, 2016

(54) FRONT-END RF FILTERS WITH EMBEDDED IMPEDANCE TRANSFORMATION

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 860 days.

(21) Appl. No.: 13/101,999

(22) Filed: May 5, 2011

(65) Prior Publication Data

US 2012/0208473 A1 Aug. 16, 2012

Related U.S. Application Data

(60) Provisional application No. 61/442,058, filed on Feb. 11, 2011.

(51) Int. Cl.

| | |
|---|---|
| ***H04B 1/04*** | (2006.01) |
| ***H04B 1/7093*** | (2011.01) |
| ***H04B 1/18*** | (2006.01) |
| *H04B 1/00* | (2006.01) |

(52) U.S. Cl.

CPC ................ *H04B 1/0458* (2013.01); *H04B 1/18* (2013.01); *H04B 1/005* (2013.01)

(58) Field of Classification Search

CPC ............... H04B 1/0458; H04B 1/7093; H04B 2203/5491; H04B 1/40

USPC ............. 455/213, 286, 248.1, 107, 77, 550.1, 455/552.1, 553.1

See application file for complete search history.

(56) References Cited

U.S. PATENT DOCUMENTS

| | | | |
|---|---|---|---|
| 5,280,638 | A | 1/1994 | Porambo et al. |
| 5,969,582 | A | 10/1999 | Boesch et al. |
| 5,973,568 | A | 10/1999 | Shapiro et al. |
| 7,633,345 | B2 | 12/2009 | Zhan |
| 7,660,562 | B2 | 2/2010 | Onno |

(Continued)

FOREIGN PATENT DOCUMENTS

| | | | |
|---|---|---|---|
| CN | 101615920 | A | 12/2009 |
| EP | 0828307 | A2 | 3/1998 |

(Continued)

OTHER PUBLICATIONS

Fattinger, et al., "Single-to-balanced Filters for Mobile Phones using Coupled Resonator BAW Technology", IEEE Ultrasonics Symposium, 2004, pp. 416-419.

(Continued)

*Primary Examiner* — Andrew Wendell
(74) *Attorney, Agent, or Firm* — James Gutierrez

(57) ABSTRACT

Front-end radio frequency (RF) filters with embedded impedance transformation are disclosed. In an exemplary design, an apparatus includes an active circuit and an RF filter. The active circuit receives an input signal and provides an output signal. The RF filter is operatively coupled to an antenna and the active circuit and performs filtering for the input signal or output signal. The RF filter is impedance matched to the active circuit and includes a non-LC filter. In an exemplary design, the active circuit includes a low noise amplifier (LNA), and the RF filter includes a receive (RX) filter having an output impedance that is matched to an input impedance of the LNA. In another exemplary design, the active circuit includes a power amplifier, and the RF filter includes a transmit (TX) filter having an input impedance that is matched to an output impedance of the power amplifier.

23 Claims, 9 Drawing Sheets

(56) References Cited

U.S. PATENT DOCUMENTS

| | | | | |
|---|---|---|---|---|
| 7,796,970 | B2 | 9/2010 | Rofougaran et al. | |
| 8,369,250 | B1 * | 2/2013 | Khlat | H04L 5/14 370/280 |
| 2004/0224643 | A1 | 11/2004 | Nakai | |
| 2006/0012442 | A1 * | 1/2006 | Shinbo et al. | 331/17 |
| 2006/0145781 | A1 * | 7/2006 | Layne | H04B 1/0057 333/132 |
| 2007/0290767 | A1 | 12/2007 | Ali-Ahmad et al. | |
| 2008/0116993 | A1 * | 5/2008 | Yamakawa et al. | 333/124 |
| 2009/0179714 | A1 * | 7/2009 | Ali-Ahmad et al. | 333/189 |
| 2009/0291647 | A1 * | 11/2009 | Tang et al. | 455/101 |
| 2011/0051670 | A1 * | 3/2011 | Safarian et al. | 370/328 |
| 2011/0237204 | A1 * | 9/2011 | Jamneala et al. | 455/73 |

FOREIGN PATENT DOCUMENTS

| | | | |
|---|---|---|---|
| JP | 2003198413 | A | 7/2003 |
| JP | 2005535245 | A | 11/2005 |
| JP | 2006033108 | A | 2/2006 |
| JP | 2008532334 | A | 8/2008 |
| WO | 0072457 | A1 | 11/2000 |
| WO | WO-2004015881 | A1 | 2/2004 |
| WO | WO-2006093063 | A1 | 9/2006 |

OTHER PUBLICATIONS

Hashimoto K., et al., “Application of SAW devices to matching elements in RF circuits”, 2003 IEEE Ultrasonics Symposium Proceedings. Honolulu, Hawaii, Oct. 5, 2003-Oct. 8, 2003 New York, NY, IEEE, US, vol. 1, Oct. 5, 2003, pp. 407-410, XP010702782, DOI: 10.1109/ULTSYM.2003.1293433 ISBN: 978-0-7803-7922-0.

International Search Report and Written Opinion—PCT/US2012/024870—ISA/EPO—May 4, 2012.

* cited by examiner

FRONT-END RF FILTERS WITH EMBEDDED IMPEDANCE TRANSFORMATION

CLAIM OF PRIORITY UNDER 35 U.S.C. §119

The present application for patent claims priority to Provisional U.S. Application Ser. No. 61/442,058, entitled "FRONT-END RF FILTERS WITH EMBEDDED IMPEDANCE TRANSFORMATION," filed Feb. 11, 2011, assigned to the assignee hereof, and expressly incorporated herein by reference.

BACKGROUND

I. Field

The present disclosure relates generally to electronics, and more specifically to filters suitable for use in wireless devices.

II. Background

A wireless device in a wireless full-duplex communication system can simultaneously transmit and receive data for two-way communication. The wireless device may include a transmitter for data transmission and a receiver for data reception. The transmitter may modulate a radio frequency (RF) carrier signal with data to obtain a modulated signal and may amplify this modulated signal to obtain an output RF signal having the proper signal level. The output RF signal may be routed through a duplexer and transmitted via an antenna to a base station. The receiver may obtain a received RF signal via the antenna and the duplexer. The receiver may amplify, filter, and downconvert the received RF signal to obtain baseband signals, which may be further processed to recover data transmitted by the base station.

The transmitter may include various circuits such as a power amplifier (PA), an impedance matching circuit, a transmit (TX) filter, etc. The receiver may also include various circuits such as a receive (RX) filter, an impedance matching circuit, a low noise amplifier (LNA), etc. The TX filter and RX filter are front-end RF filters, which are filters that pass desired signal components and attenuate undesired signal components at radio frequency. It may be desirable to reduce the number and/or complexity of circuits in the transmitter and receiver in order to reduce the cost and size of the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Front-end RF filters with embedded impedance transformation are described herein and are also referred to as Z-matched RF filters. These Z-matched RF filters may perform the function normally performed by impedance matching circuits and may thus enable these impedance matching circuits to be omitted from a wireless device, which may reduce the cost and size of the wireless device. The Z-matched RF filters may be used for wireless devices of various types such as cellular phones, personal digital assistants (PDAs), handheld devices, wireless modems, laptop computers, smartphones, tablets, cordless phones, Bluetooth devices, consumer electronic devices, etc.

Figure 1:
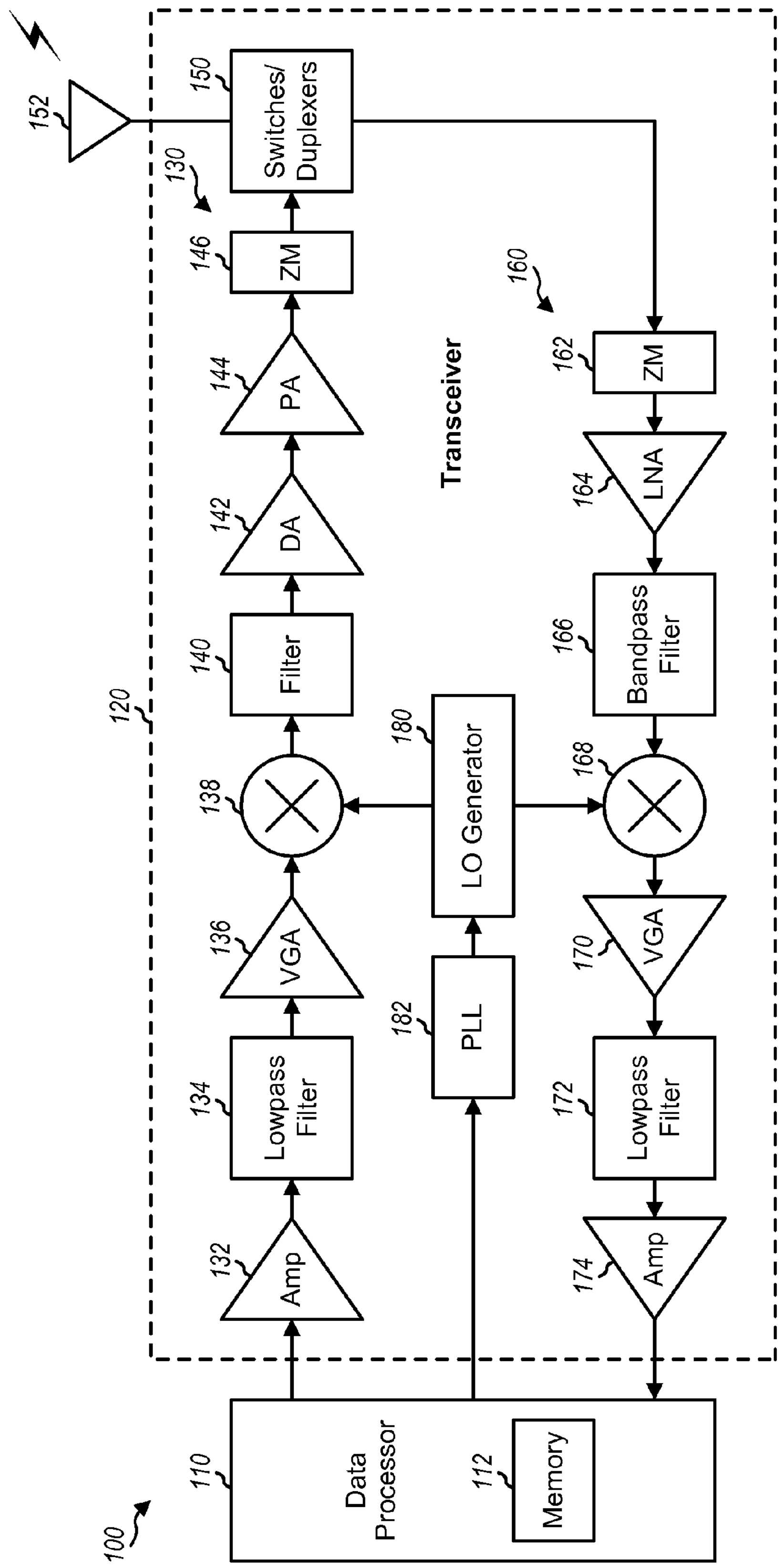
FIG. 1 shows a block diagram of a wireless device.

FIG. 1 shows a block diagram of an exemplary design of a wireless device 100. In this exemplary design, wireless device 100 includes a data processor 110, a transceiver 120, and an antenna 152. Transceiver 120 includes a transmitter 130 and a receiver 160 that support bi-directional wireless communication. In general, wireless device 100 may include any number of transmitters and any number of receivers for any number of communication systems, any number of frequency bands, and any number of antennas.

In the transmit path, data processor 110 processes data to be transmitted and provides an analog output signal to transmitter 130. Within transmitter 130, the analog output signal is amplified by an amplifier (Amp) 132, filtered by a lowpass filter 134 to remove images caused by digital-to-analog conversion, amplified by a variable gain amplifier (VGA) 136, and upconverted from baseband to RF by an upconverter 138. The upconverted signal is filtered by a filter 140, further amplified by a driver amplifier (DA) 142 and a power amplifier (PA) 144, routed through an impedance matching circuit (ZM) 146 and switches/duplexers 150, and transmitted via antenna 152.

In the receive path, antenna 152 receives signals from base stations and/or other transmitter stations and provides a received signal, which is routed through switches/duplexers 150 and provided to receiver 160. Within receiver 160, the received signal is routed through an impedance matching circuit 162, amplified by an LNA 164, filtered by a bandpass filter 166, and downconverted from RF to baseband by a downconverter 168. The downconverted signal is amplified by a VGA 170, filtered by a lowpass filter 172, and amplified by an amplifier 174 to obtain an analog input signal, which is provided to data processor 110.

FIG. 1 shows transmitter 130 and receiver 160 implementing a direct-conversion architecture, which frequency converts a signal between RF and baseband in one stage. Transmitter 130 and/or receiver 160 may also implement a super-heterodyne architecture, which frequency converts a signal between RF and baseband in multiple stages. A local oscillator (LO) generator 180 generates and provides transmit and receive LO signals to upconverter 138 and downconverter 168, respectively. A phase locked loop (PLL) 182 receives control information from data processor 110 and provides control signals to LO generator 180 to generate the transmit and receive LO signals at the proper frequencies.

FIG. 1 shows an exemplary transceiver design for one antenna. In general, the conditioning of the signals in transmitter 130 and receiver 160 may be performed by one or more stages of amplifier, filter, mixer, etc. These circuits may be arranged differently from the configuration shown in FIG. 1. Furthermore, other circuits not shown in FIG. 1 may also be used in the transmitter and receiver. For example, impedance matching circuits may be used to match various active circuits in FIG. 1. Some circuits in FIG. 1 may also be omitted. All or a portion of transceiver 120 may be implemented on one or more analog integrated circuits (ICs), RF ICs (RFICs), mixed-signal ICs, etc. For example, amplifier 132 through power amplifier 144 in transmitter 130 may be implemented on an RFIC. Power amplifier 144 and impedance matching circuit 146 may also be implemented on another IC or module that is external to the RFIC.

Data processor 110 may perform various functions for wireless device 100, e.g., processing for data being transmitted and received. A memory 112 may store program codes and data for data processor 110. Data processor 110 may be implemented on one or more application specific integrated circuits (ASICs) and/or other ICs.

A wireless device may include multiple (e.g., two) antennas, which may be used to support receive diversity, multiple-input multiple-output (MIMO) transmission, etc. An antenna may be associated with a transmitter and a receiver to support bi-directional wireless communication via that antenna. An antenna may also be associated with only a receiver to support diversity reception. An antenna may also be associated with multiple transmitters and/or multiple receivers to support multiple radio technologies and/or multiple frequency bands.

Figure 2:
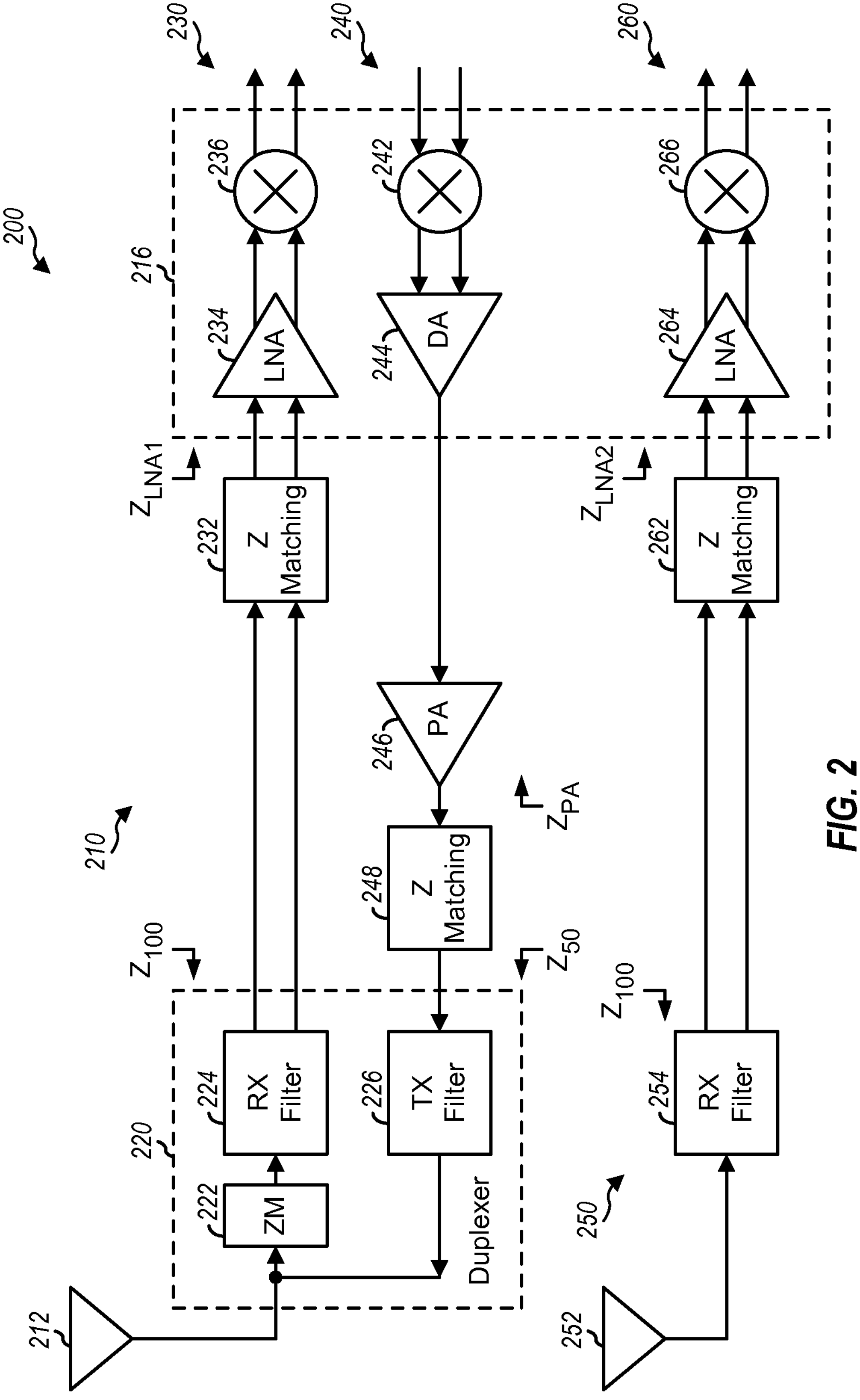
FIG. 2 shows an RF section of a wireless device with two antennas.

FIG. 2 shows a block diagram of an RF section of a wireless device 200 with two antennas for diversity reception. Wireless device 200 includes a primary section 210 coupled to a primary antenna 212 and a diversity section 250 coupled to a diversity/secondary antenna 252.

Primary section 210 supports data transmission and reception simultaneously and includes a duplexer 220, a receiver 230, and a transmitter 240. Duplexer 220 includes an impedance matching circuit 222, an RX filter 224, and a TX filter 226 packaged together within a module. Matching circuit 222 is coupled between antenna 212 and RX filter 224. TX filter 226 is coupled directly to antenna 212. Duplexer 220 is typically located close to antenna 212. Receiver 230 includes an impedance matching circuit 232, an LNA 234, and a downconverter 236 coupled in series. The output of RX filter 224 is coupled to the input of impedance matching circuit 232. Transmitter 240 includes an upconverter 242, a driver amplifier 244, a power amplifier 246, and an impedance matching circuit 248 coupled in series. The output of impedance matching circuit 248 is coupled to the input of TX filter 226.

Diversity section 250 supports data reception and includes a receiver 260. Receiver 260 includes an RX filter 254, an impedance matching circuit 262, an LNA 264, and a downconverter 266 coupled in series. The input of RX filter 254 is coupled to antenna 252.

In the exemplary design shown in FIG. 2, RX filter 224 receives a single-ended input signal from impedance matching circuit 222 and provides a differential output signal. Impedance matching circuit 232, LNA 234, and downconverter 236 operate on differential signals. Driver amplifier 244 receives a differential input signal from upconverter 242 and provides a single-ended signal. Power amplifier 246, impedance matching circuit 248, and TX filter 226 operate on single-ended output signals.

Power amplifier 246 and impedance matching circuit 248 may be part of a PA module. LNAs 234 and 264, downconverters 236 and 266, upconverter 242, and driver amplifier 244 may be part of an RF transceiver (RTR) module 216. Impedance matching circuits 232, 248 and 262 may be implemented with inductors (L), capacitors (C), and/or other discrete circuit components.

A conventional wireless device (such as wireless device 200 in FIG. 2) may have several drawbacks. First, front-end RF filters are typically designed with standard input and output impedances of 50 Ohms single-ended or 100 Ohms differential. For example, RX filters 224 and 254 in FIG. 2 may each have an output impedance of 100 Ohms differential, and TX filter 226 may have an input impedance of 50 Ohms single-ended. The active circuits that interface the RF filters typically have non-standard impedances. For example, LNA 234 may have an input impedance of $Z_{LNA1}$, LNA 264 may have an input impedance of $Z_{LNA2}$, and power amplifier 246 may have an output impedance of $Z_{PA}$, where $Z_{LNA1}$ and $Z_{LNA2}$ are typically not equal to 100 Ohms differential and $Z_{PA}$ is typically not equal to 50 Ohms single-ended. Hence, LNAs 234 and 264 and power amplifier 246 would need to be matched to standard impedances using impedance matching circuits 232, 262 and 248, respectively. For example, impedance matching circuits 232 and 262 may have input impedances of 100 Ohms differential and output impedances of $Z_{LNA1}$ and $Z_{LNA2}$ differential, respectively. Impedance matching circuit 248 may have an input impedance of $Z_{PA}$ single-ended and an output impedance of 50 Ohms single-ended. The impedance matching circuits are typically implemented with passive inductors and capacitors (i.e., LC components), which may increase the size and cost of the wireless device and may also degrade performance.

Furthermore, a transmitter and a receiver in a transceiver for a primary section typically connect to an antenna via a duplexer, e.g., for WCDMA, LTE, cdma2000, etc. A duplexer (such as duplexer 220 in FIG. 2) includes a TX filter and an RX filter implemented on the same package. Having the TX filter and RX filter on the same package may (i) degrade isolation between the transmitter and the receiver and (ii) make routing between the TX filter and RX filter and their associated power amplifier and LNA more difficult. Furthermore, the duplexer is typically placed close to the antenna, which may make routing differential RF signals between the RX filters and LNAs crowded.

In an aspect, a front-end RF filter may have embedded impedance transformation and may be internally matched directly to an active circuit (e.g., an amplifier) that interfaces with the RF filter. The RF filter with embedded impedance transformation may be referred to as a Z-matched RF filter. The Z-matched RF filter may allow an impedance matching circuit to be omitted and may also provide other advantages, as described below.

Figure 3:
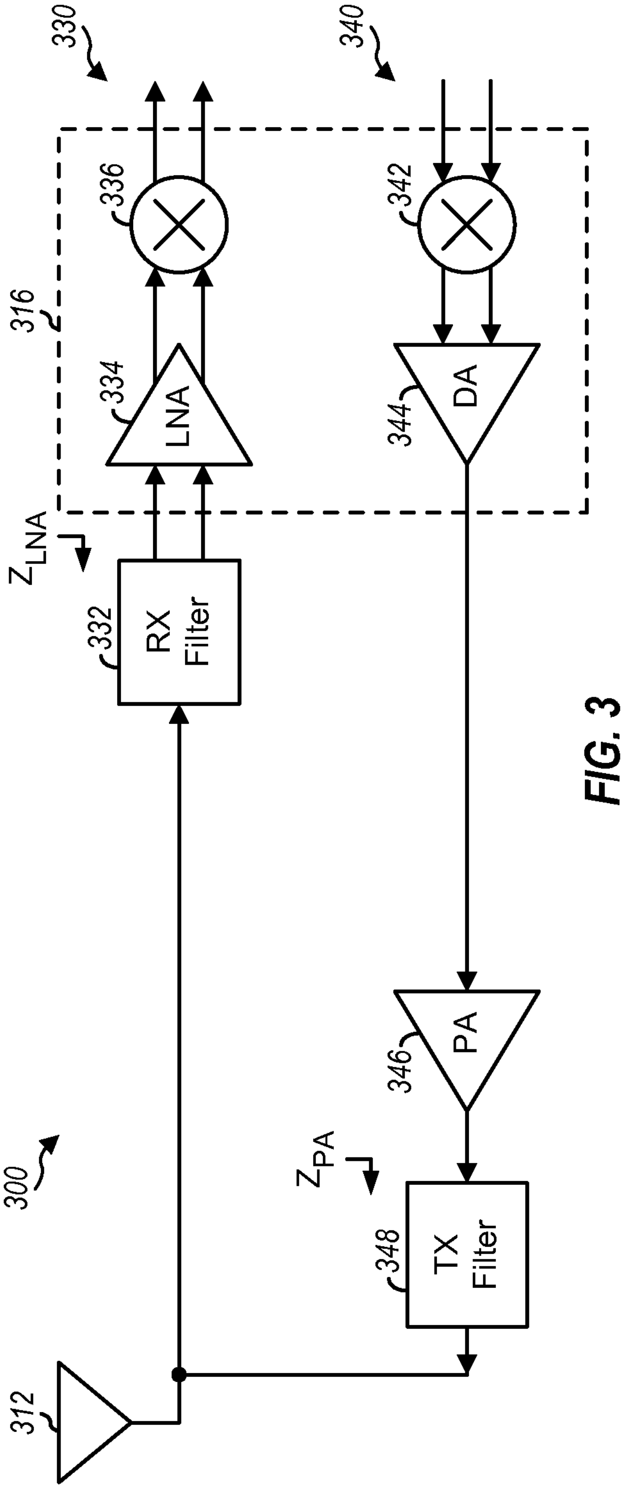
FIG. 3 shows a single-antenna single-band RF section with Z-matched RF filters having embedded impedance transformation.

FIG. 3 shows a block diagram of an exemplary design of a single-antenna single-band RF section of a wireless device 300 with Z-matched RF filters. Wireless device 300 includes a single antenna 312, a receiver 330, and a transmitter 340. Receiver 330 includes an RX filter 332, an LNA 334, and a downconverter 336 coupled in series. RX filter 332 has its input coupled to antenna 312 and its output coupled to LNA 334. Transmitter 340 includes an upconverter 342, a driver amplifier 344, a power amplifier 346, and a TX filter 348 coupled in series. TX filter 348 has its input coupled to power amplifier 346 and its output coupled to antenna 312. In an exemplary design, LNA 334, downconverter 336, upconverter 342, and driver amplifier 344 are part of an RTR module 316.

As shown in FIG. 3, RX filter 332 and TX filter 348 (which are normally implemented within a duplexer) may be separated and placed closer to their associated amplifiers. RX filter 332 may be placed close to LNA 334 and may be impedance matched directly to the input of LNA 334. Similarly, TX filter 348 may be placed close to power amplifier 346 and may be impedance matched directly to the output of power amplifier 346. Quarter-wavelength transmission lines often used between an RX filter input and an antenna port inside a duplexer package may be brought outside and replaced by routings from RX filter 332 to antenna 312. Although not shown in FIG. 3, an impedance matching circuit may be coupled between antenna 312 and RX filter 332 and may be located close to antenna 312.

Although not shown in FIG. 3, a phase shift circuit/network may be coupled to the antenna ports of RX filter 332 and TX filter 348, which may be implemented in separate filter packages. The phase shift circuit may be used in a full-duplex system and may be located between the separate filter packages for RX filter 332 and TX filter 348. The phase shift circuit may be used to vary the phase between the input signal for RX filter 332 and the output signal from TX filter 348. In an exemplary design, the phase shift circuit may be implemented with LC components. In another exemplary design, the phase shift circuit may be implemented with transmission lines. In yet another exemplary design, the phase shift circuit may be implemented with a combination of LC components and transmission lines.

RX filter 332 and TX filter 348 may be implemented with non-LC filters. A non-LC filter may be any filter that is not implemented with passive/discrete inductors and capacitors. For example, RX filter 332 and TX filter 348 may be implemented with surface acoustic wave (SAW) filters, bulk acoustic wave (BAW) filters, thin film bulk acoustic resonator (FBAR) filters, micro-electro-mechanical system (MEMS) resonator filters, cavity resonator filters, ceramic filters, or filters of other types. RX filter 332 and TX filter 348 may include embedded impedance matching sections within these RF filters.

The use of RF filters with embedded impedance transformation may provide various advantages. First, the use of these RF filters may reduce the cost and size of a wireless device. As shown in FIGS. 2 and 3, discrete impedance matching circuits 232 and 262 between RX filters 224 and 254 and LNAs 234 and 264 and discrete impedance matching circuit 248 between TX filter 226 and power amplifier 246 in FIG. 2 may be replaced with embedded impedance matching sections inside RF filters 332 and 348 in FIG. 3. The embedded impedance matching sections within RF filters 332 and 348 may be much smaller in size than discrete LC components within impedance matching circuits 232, 248 and 262. The cost and size of a wireless device may be reduced by eliminating the impedance matching circuits and using slightly more complex RF filters with embedded impedance transformation. The benefits may be especially desirable in newer wireless devices supporting multiple frequency bands, multiple antennas, and/or multiple radio technologies.

Second, the use of RF filters with embedded impedance transformation may improve performance. The embedded impedance matching inside RF filters implemented with SAW, BAW, or FBAR technology may use high quality factor (Q) resonators (e.g., Q>200) as opposed to low Q discrete components (Q<50) typically used in impedance matching circuits. The high-Q resonators may reduce power loss associated with impedance matching, lower receiver noise figure (NF), and increase transmit efficiency.

Third, the use of RF filters with embedded impedance transformation may simplify routing of signal lines. For example, the number of signal lines from antenna 312 to LNA 334 in FIG. 3 may be reduced by one half by placing RX filter 332 close to LNA 334 and running a single-ended signal line between antenna 312 and RX filter 332. In contrast, RF filter 224 in FIG. 2 may be placed close to antenna 212 and may be coupled to impedance matching circuit 232 via differential signal lines.

Fourth, splitting a duplexer into separate RX filter 332 and TX filter 348 may reduce leakage from the transmitter to the receiver due to parasitic coupling between the TX and RX ports of the duplexer. The overall size of RX filter 332 and TX filter 348 in a "split" duplexer should be similar to the overall size of a conventional duplexer that physically includes two packaged RF filters inside.

Figure 4:
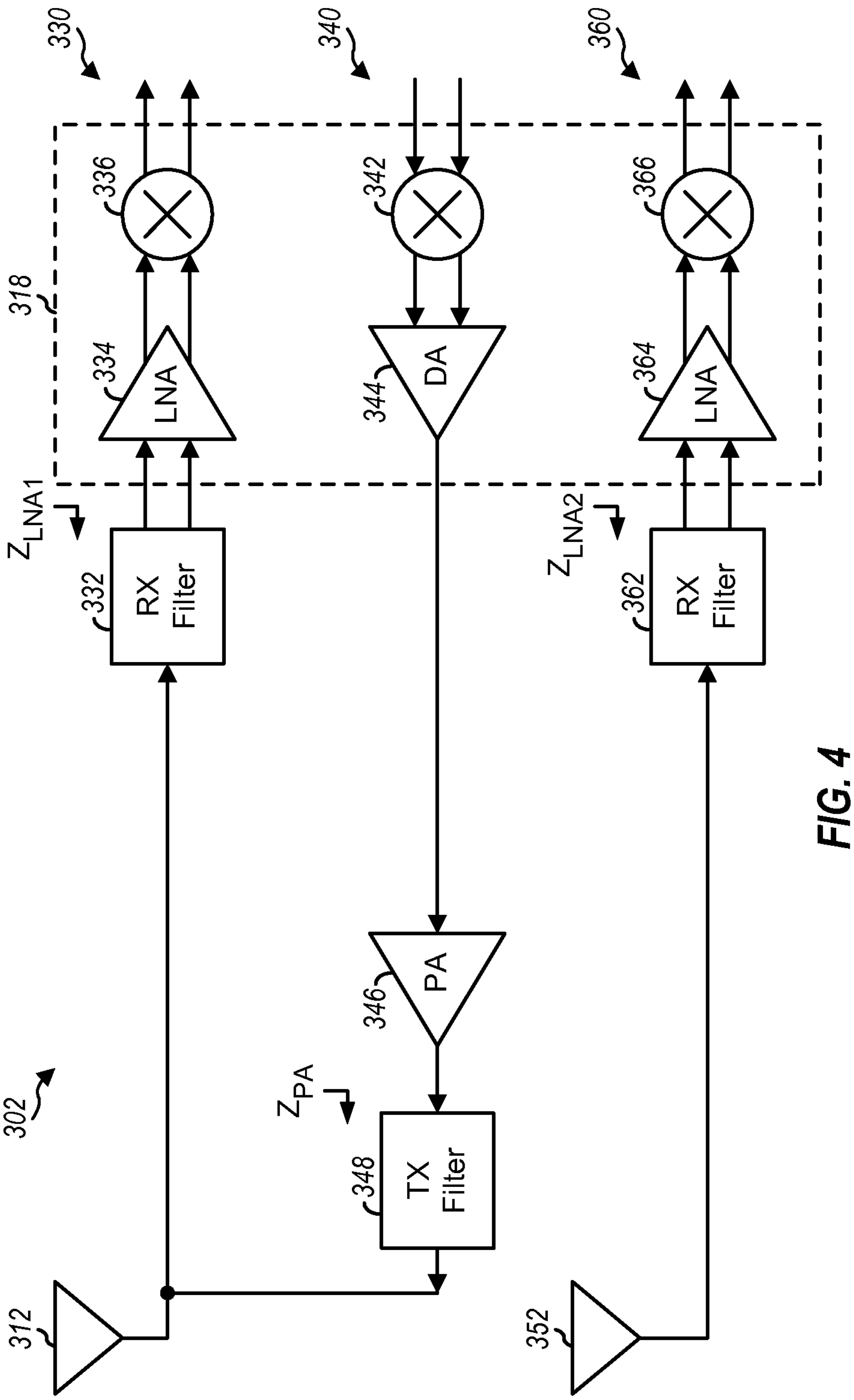
FIG. 4 shows a dual-antenna single-band RF section with Z-matched RF filters.

FIG. 4 shows a block diagram of an exemplary design of a dual-antenna single-band RF section of a wireless device 302 with Z-matched RF filters. Wireless device 302 includes all of the circuits within wireless device 300 in FIG. 3. Wireless device 302 further includes a diversity section that supports data reception and includes a receiver 360 coupled to a diversity antenna 352. Receiver 360 includes an RX filter 362, an LNA 364, and a downconverter 366 coupled in series. The input of RX filter 362 is coupled to antenna 352. RX filter 362 may be implemented in similar manner as RX filter 332. RX filter 362 may be placed close to LNA 364 and may be impedance matched directly to the input of LNA 364. Although not shown in FIG. 4, an impedance matching circuit may be coupled between antenna 352 and RX filter 362 and may be located close to antenna 352. In an exemplary design, LNAs 334 and 364, downconverters 336 and 366, upconverter 342, and driver amplifier 344 are part of an RTR module 318.

Figure 5:
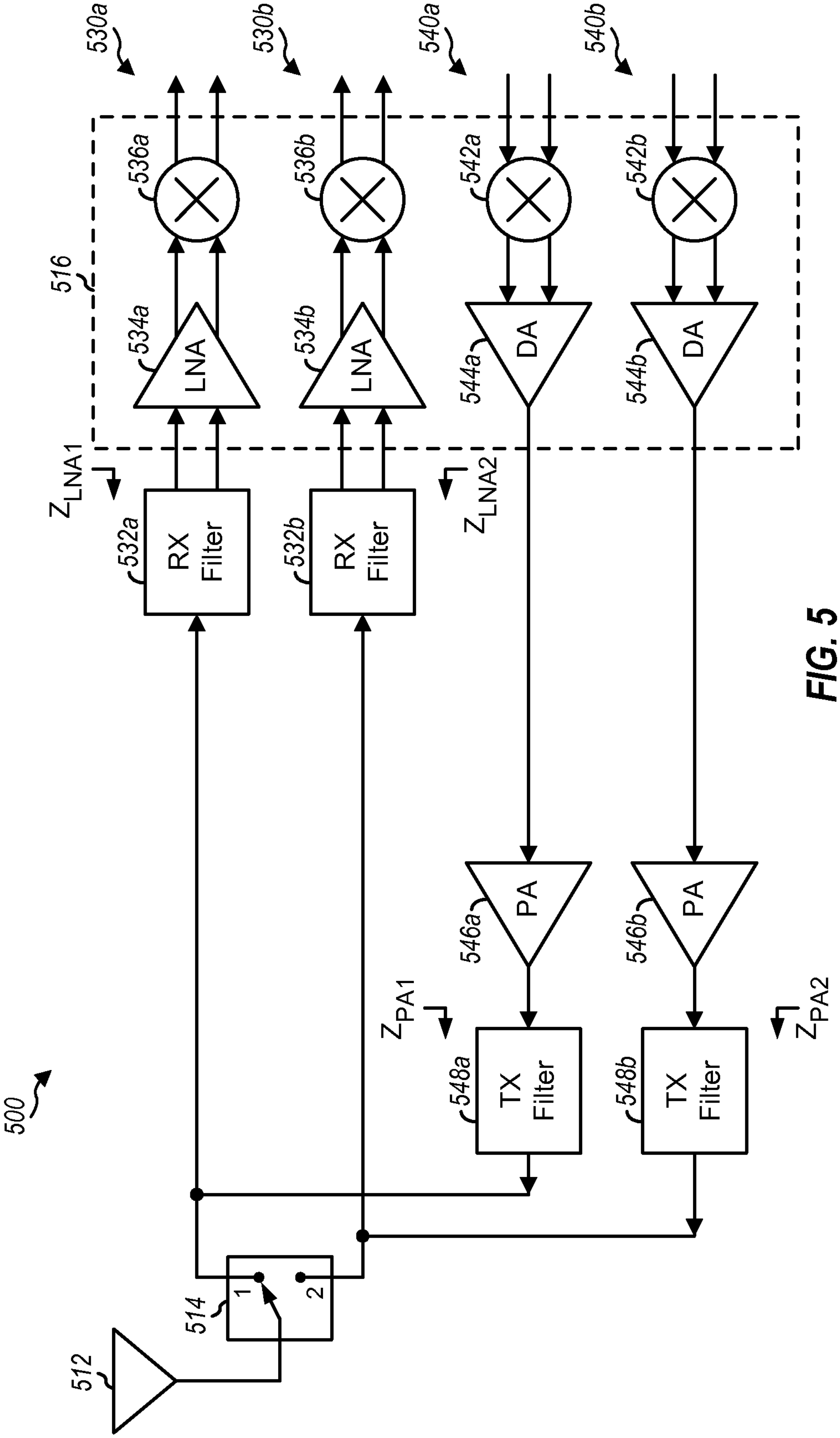
FIG. 5 shows a single-antenna dual-band RF section with Z-matched RF filters.

FIG. 5 shows a block diagram of an exemplary design of a single-antenna dual-band RF section of a wireless device 500 with Z-matched RF filters. Wireless device 500 includes a single antenna 512, a switch 514, two receiver **530*a* and 530*b*, and two transmitters 540*a* and 540*b*. Receiver 530*a* includes an RX filter 532*a*, an LNA 534*a*, and a downconverter 536*a* coupled in series and designed for a first frequency band (e.g., 800 MHz). Receiver 530*b* includes an RX filter 532*b*, an LNA 534*b*, and a downconverter 536*b* coupled in series and designed for a second frequency band (e.g., 1900 MHz). LNA 534*a* has an input impedance of $Z_{LNA1}$, and LNA 534*b* has an input impedance of $Z_{LNA2}$. RX filter 532*a* is located close to LNA 534*a* and has its output impedance matched to the input impedance of LNA 534*a*. Similarly, RX filter 532*b* is located close to LNA 534*b* and has its output impedance matched to the input impedance of LNA 534*b***.

Transmitter **540*a* includes an upconverter 542*a*, a driver amplifier 544*a*, a power amplifier 546*a*, and a TX filter 548*a* coupled in series and designed for the first frequency band. Transmitter 540*b* includes an upconverter 542*b*, a driver amplifier 544*b*, a power amplifier 546*b*, and a TX filter 548*b* coupled in series and designed for the second frequency band. Power amplifier 546*a* has an output impedance of $Z_{PA1}$, and power amplifier 546*b* has an output impedance of $Z_{PA2}$. TX filter 548*a* is located close to power amplifier 546*a* and has its input impedance matched to the output impedance of power amplifier 546*a*. Similarly, TX filter 548*b* is located close to power amplifier 546*b* and has its input impedance matched to the output impedance of power amplifier 546*b***.

Switch 514 has its input coupled to antenna 512, its first output (labeled '1') coupled to RX filter **532*a* and TX filter 548*a* for the first frequency band, and its second output (labeled '2') coupled to RX filter 532*b* and TX filter 548*b* for the second frequency band. Switch 514 connects antenna 512 to either (i) RX filter 532***a* and TX filter 548*a* when operation in the first frequency band is selected or (ii) RX filter 532*b* and TX filter 548*b* when operation in the second frequency band is selected. In an exemplary design, LNAs 534*a* and 534*b*, downconverters 536*a* and 536*b*, upconverters 542*a* and 542*b*, and driver amplifiers 544*a* and 544*b* are part of an RTR module 516.

Figure 6:
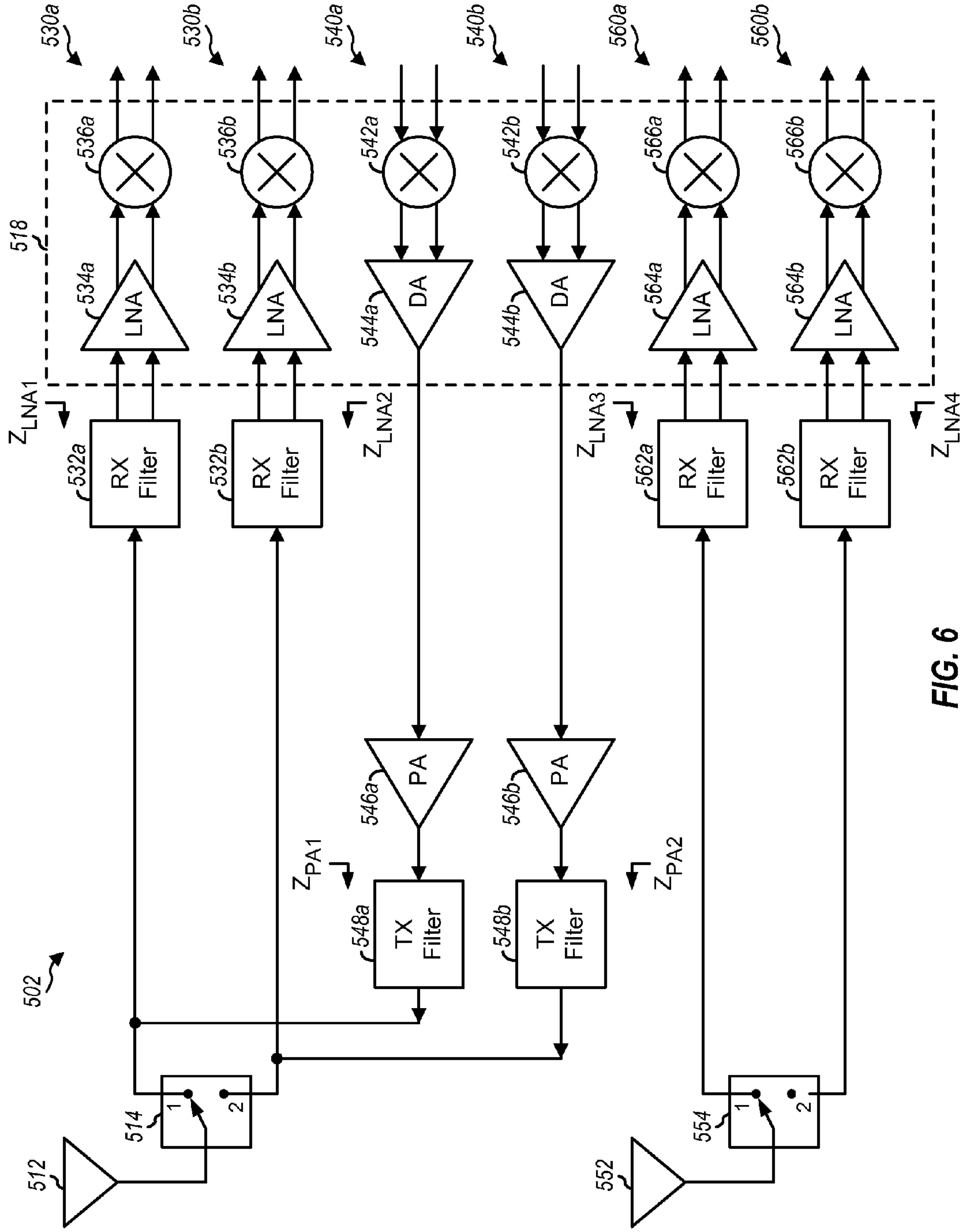
FIG. 6 shows a dual-antenna dual-band RF section with Z-matched RF filters.

FIG. 6 shows a block diagram of an exemplary design of a dual-antenna dual-band RF section of a wireless device 502 with Z-matched RF filters. Wireless device 502 includes all of the circuits within wireless device 500 in FIG. 5. Receivers 530*a* and 530*b* and transmitters 540*a* and 540*b* are part of a primary section coupled to antenna 512 and supporting data transmission and reception on two frequency bands.

Wireless device 502 further includes a diversity section with two receiver 560*a* and 560*b* to support data reception on two frequency bands. Receiver 560*a* includes an RX filter 562*a*, an LNA 564*a*, and a downconverter 566*a* coupled in series and designed for the first frequency band. Receiver 560*b* includes an RX filter 562*b*, an LNA 564*b*, and a downconverter 566*b* coupled in series and designed for the second frequency band. LNA 564*a* has an input impedance of $Z_{LNA3}$, and LNA 564*b* has an input impedance of $Z_{LNA4}$. RX filter 562*a* is located close to LNA 564*a* and has its output impedance matched to the input impedance of LNA 564*a*. Similarly, RX filter 562*b* is located close to LNA 564*b* and has its output impedance matched to the input impedance of LNA 564*b*.

A switch 554 has its input coupled to a diversity antenna 552, its first output (labeled '1') coupled to RX filter 562*a* for the first frequency band, and its second output (labeled '2') coupled to RX filter 562*b* for the second frequency band. Switch 554 connects antenna 552 to either (i) RX filter 562*a* when operation in the first frequency band is selected or (ii) RX filter 562*b* when operation in the second frequency band is selected. In an exemplary design, LNAs 534*a*, 534*b*, 564*a* and 564*b*, downconverters 536*a*, 536*b*, 566*a* and 566*b*, upconverters 542*a* and 542*b*, and driver amplifiers 544*a* and 544*b* are part of an RTR module 518.

Figure 7:
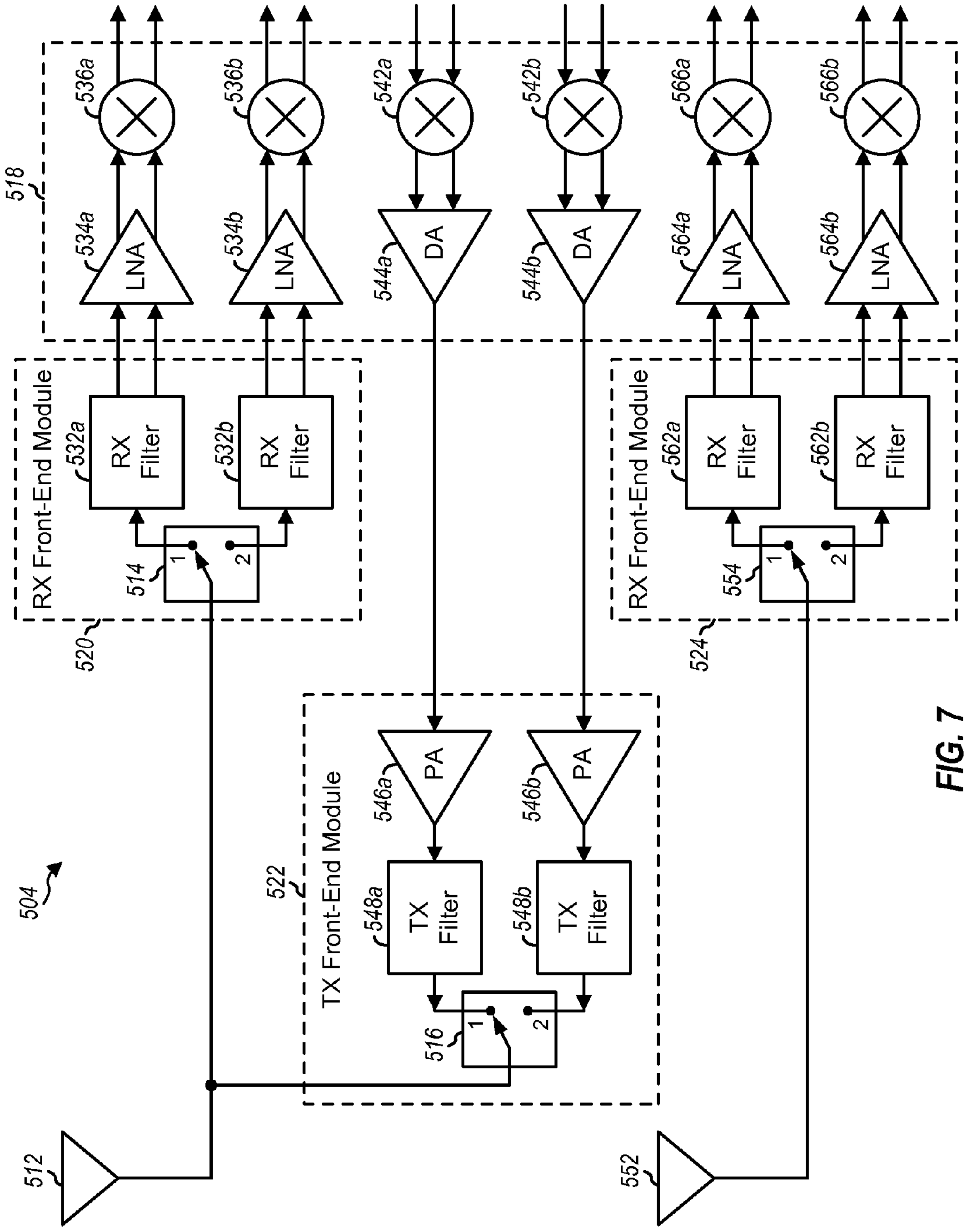
FIGS. 7 and 8 show two exemplary dual-antenna dual-band RF sections with Z-matched RF filters.

FIG. 7 shows a block diagram of an exemplary design of a dual-antenna dual-band RF section of a wireless device 504 with Z-matched RF filters. Wireless device 504 includes all of the circuits within wireless device 502 in FIG. 6 and further includes a switch 516. Switch 514 is placed close to RX filters 532*a* and 532*b* and selects the first or second frequency band for a primary receive path. Switch 516 is placed close to TX filters 548*a* and 548*b* and selects the first or second frequency band for a primary transmit path. Switch 554 is placed close to RX filters 562*a* and 562*b* and selects the first or second frequency band for the diversity receive path. RX filters 532*a*, 532*b*, 562*a* and 562*b* are impedance matched directly to the inputs of LNAs 534*a*, 534*b*, 564*a* and 564*b*, respectively. TX filters 548*a* and 548*b* are impedance matched directly to the outputs of power amplifiers 546*a* and 546*b*, respectively.

A first RX front-end module (FEM) 520 includes switch 514 and RX filters 532*a* and 532*b* and is placed close to LNAs 534*a* and 534*b*. A TX front-end module 522 includes switch 516, TX filters 548*a* and 548*b*, and power amplifiers 546*a* and 546*b* and is placed close to antenna 512 to minimize losses after the power amplifiers. A second RX front-end module 524 includes switch 554 and RX filters 562*a* and 562*b* and is placed close to LNAs 564*a* and 564*b*. The exemplary design in FIG. 7 may provide the advantages described above and may further reduce the number of signal lines between the antennas and the LNAs.

Figure 8:
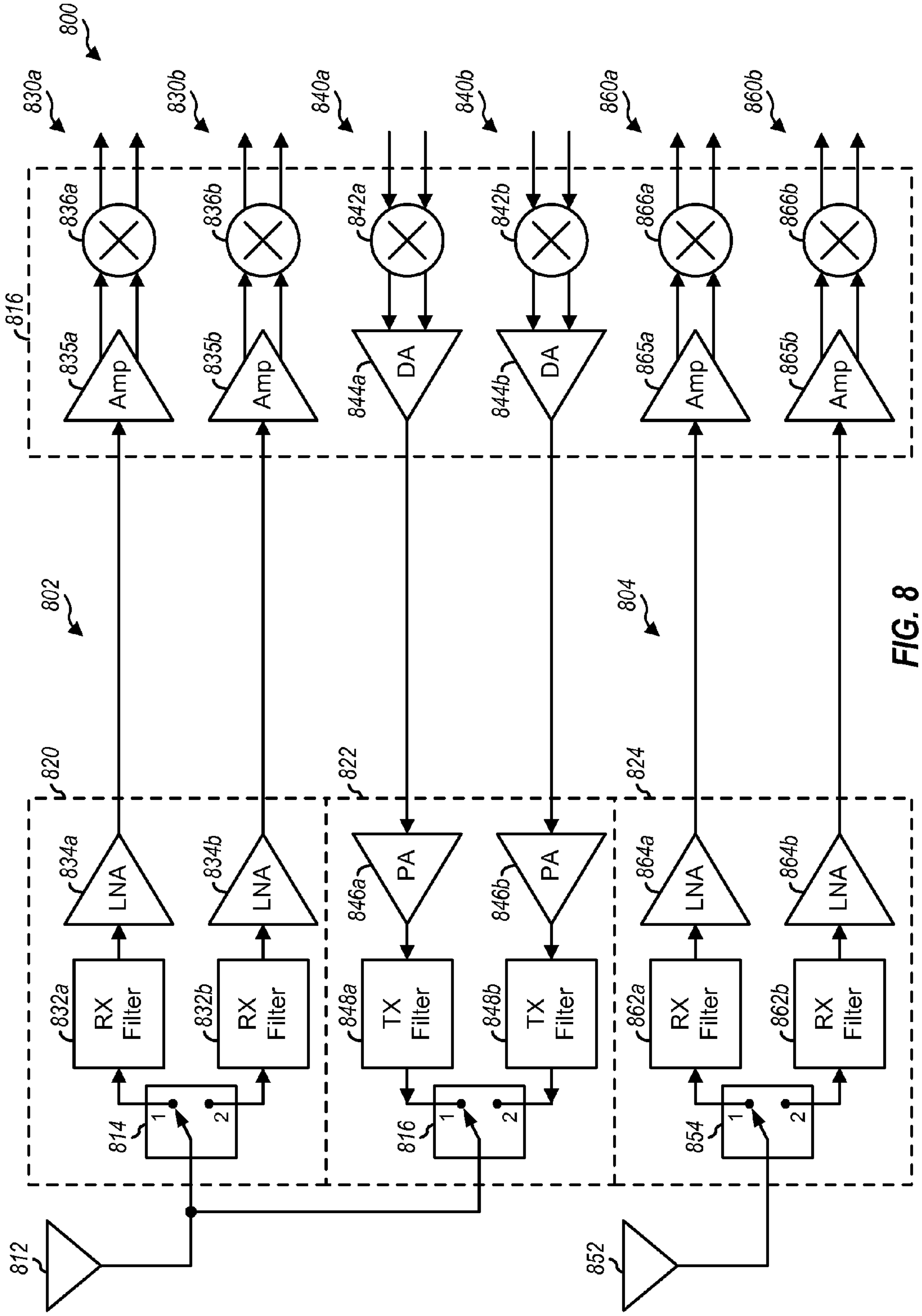

FIG. 8 shows a block diagram of an exemplary design of a dual-antenna dual-band RF section of a wireless device 800 with Z-matched RF filters. Wireless device 800 includes a primary section 802 coupled to a primary antenna 812 and a diversity section 804 coupled to a diversity antenna 852.

Primary section 802 includes switches 814 and 816, two receiver 830*a* and 830*b*, and two transmitters 840*a* and 840*b*. Receiver 830*a* includes an RX filter 832*a*, an LNA 834*a*, an amplifier 835*a*, and a downconverter 836*a* coupled in series and designed for a first frequency band. Receiver 830*b* includes an RX filter 832*b*, an LNA 834*b*, an amplifier 835*b*, and a downconverter 836*b* coupled in series and designed for a second frequency band. RX filters 832*a* and 832*b* are impedance matched directly to the inputs of LNAs 834*a* and 834*b*, respectively. Switch 814, RX filters 832*a* and 832*b*, and LNAs 834*a* and 834*b* are part of a first RX front-end module 820, which is placed close to antenna 812 to minimize transmission line losses before the LNAs.

Transmitter 840*a* includes an upconverter 842*a*, a driver amplifier 844*a*, a power amplifier 846*a*, and a TX filter 848*a* coupled in series and designed for the first frequency band. Transmitter 840*b* includes an upconverter 842*b*, a driver amplifier 844*b*, a power amplifier 846*b*, and a TX filter 848*b* coupled in series and designed for the second frequency band. TX filters 848*a* and 848*b* are impedance matched directly to the outputs of power amplifiers 846*a* and 846*b*, respectively. Switch 816, TX filters 848*a* and 848*b*, and power amplifiers 846*a* and 846*b* are part of a TX front-end module 822, which is placed close to antenna 812 to minimize losses after the power amplifiers.

Diversity section 804 includes a switch 854, and two receiver 860*a* and 860*b*. Receiver 860*a* includes an RX filter 862*a*, an LNA 864*a*, an amplifier 865*a*, and a downconverter 866*a* coupled in series and designed for the first frequency band. Receiver 860*b* includes an RX filter 862*b*, an LNA 864*b*, an amplifier 865*b*, and a downconverter 866*b* coupled in series and designed for the second frequency band. RX filters 862*a* and 862*b* are impedance matched directly to the inputs of LNAs 864*a* and 864*b*, respectively. Switch 854, RX filters 862*a* and 862*b*, and LNAs 864*a* and 864*b* are part of a second RX front-end module 824, which is placed close to antenna 852 to minimize transmission line losses before the LNAs.

In the exemplary design shown in FIG. 8, RX filters 832*a*, 832*b*, 862*a* and 862*b* as well as LNAs 834*a*, 834*b*, 864*a* and 864*b* operate on single-ended signals. Amplifiers 835*a*, 835*b*, 865*a* and 865*b* receive single-ended input signals and provide differential output signals. Driver amplifiers 844*a* and 844*b* receive differential input signals and provide single-ended output signals. Power amplifiers 846*a* and 846*b* and TX filters 848*a* and 848*b* operate on single-ended signals. The exemplary design in FIG. 8 may reduce the number of signal lines between front-end modules 820, 822 and 824 and amplifiers 835*a*, 835*b*, 844*a*, 844*b*, 865*a* and 865*b*. In an exemplary design, amplifiers 835*a*, 835*b*, 844*a*, 844*b*, 865*a* and 865*b*, downconverters 836*a*, 836*b*, 866*a* and 866*b*, and upconverters 842*a* and 842*b* are part of an RTR module 816.

An RF filter with the desired input and/or output impedance may be obtained in various manners. In an exemplary design, an RF filter may be implemented with a double-mode SAW filter that may also be used as a balun for single-ended to differential conversion. Impedance conversion may be realized for the double-mode SAW filter by having the aperture of an output inter-digital transducer (IDT) (Wout) to be different from the aperture of an input IDT (Win). Impedance transformation may be performed as described by Endoh et al., in "High Performance Balanced Type SAW Filters in the Range of 900 MHz and 1.9 GHz," IEEE Ultrasonics Symp, pp. 41-44, 1997, and Hashimoto et al., in "Application of SAW Devices to Matching Elements in RF Circuits," IEEE Ultrasonics Symp, pp. 407-410, 2003.

Various exemplary designs of wireless devices that include RF filters with embedded impedance transformation have been described above. Wireless devices including RF filters with embedded impedance transformation may also be implemented in other manners.

In an exemplary design, an apparatus (e.g., a wireless device, an IC, etc.) may comprise an active circuit and an RF filter. The active circuit may receive an input signal and provide an output signal. The RF filter may be operatively (e.g., directly or indirectly) coupled to an antenna and the active circuit and may perform filtering for the input signal or the output signal. The RF filter may be impedance matched to the active circuit and may comprise a non-LC filter. For example, the RF filter may comprise a SAW filter, a BAW filter, a FBAR filter, a MEMS resonator filter, a cavity resonator filter, a ceramic filter, etc. In an exemplary design, the RF filter may be coupled directly to the active circuit, with no external impedance matching circuit between the RF filter and the active circuit. In an exemplary design, the RF filter may be coupled directly to the antenna or indirectly to the antenna via a switch, an impedance matching circuit, a filter, some other circuit, or a combination thereof. The RF filter may be placed closer to the active circuit than the antenna.

In an exemplary design, the active circuit may comprise an LNA (e.g., LNA 334 in FIG. 3). The RF filter may comprise an RX filter (e.g., RX filter 332) having an output impedance that is matched to an input impedance of the LNA. In another exemplary design, the active circuit may comprise a power amplifier (e.g., power amplifier 346 in FIG. 3). The RF filter may comprise a TX filter (e.g., TX filter 348) having an input impedance that is matched to an output impedance of the power amplifier.

In an exemplary design, the RF filter may be operatively coupled to the antenna via a single-ended connection and to the active circuit via a single-ended connection. In another exemplary design, the RF filter may be operatively coupled to the antenna via a single-ended connection and to the active circuit via a differential connection.

In an exemplary design, the apparatus may further comprise a second RF filter operatively coupled to the antenna. The RF filter and the second RF filter may support operation on at least two frequency bands and/or at least two radio technologies. In an exemplary design, the apparatus may further comprise a second active circuit to receive a second input signal and provide a second output signal. The second RF filter may be operatively coupled to the second active circuit. In another exemplary design, the apparatus may further comprise a switch operatively coupled to the antenna, the RF filter, and the second RF filter. The switch and the two RF filters may be implemented on a front-end module. In an exemplary design, the RF filter and the second RF filter may both be operatively coupled to the same active circuit, which may be shared by the two RF filters and may support operation on the at least two frequency bands and/or the at least two radio technologies. The two RF filters may be coupled to the active circuit via a switch, which may be located within or external to the front-end module. Alternatively, tuning may be added on the active circuit and/or the RF filters to support sharing of the active circuit by the two RF filters.

In another exemplary design, an apparatus (e.g., a wireless device, an IC, etc.) may comprise first and second active circuits and first and second RF filters. The first active circuit may receive a first input signal and provide a first output signal. The second active circuit may receive a second input signal and provide a second output signal. The first RF filter may be operatively (e.g., directly or indirectly) coupled to an antenna and the first active circuit. The first RF filter may be impedance matched to the first active circuit and may comprise a first non-LC filter. The second RF filter may be operatively coupled to the antenna and the second active circuit. The second RF filter may be impedance matched to the second active circuit and may comprise a second non-LC filter.

In a first exemplary design, the first active circuit may comprise an LNA (e.g., LNA 334 in FIG. 3), and the second active circuit may comprise a power amplifier (e.g., power amplifier 346). The first RF filter may comprise an RX filter (e.g., RX filter 332) having an output impedance that is matched to an input impedance of the LNA. The second RF filter may comprise a TX filter (e.g., TX filter 348) having an input impedance that is matched to an output impedance of the power amplifier. In an exemplary design, the apparatus may further comprise a phase shift circuit coupled between the RX filter and the TX filter. The phase shift circuit may be implemented with LC components and/or transmission lines.

For the first exemplary design, the apparatus may further comprise a second LNA and a second RX filter. The second LNA (e.g., LNA 364 in FIG. 4) may receive a third input signal and provide a third output signal. The second RX filter (e.g., RX filter 362) may be operatively coupled to a second/diversity antenna and the second LNA. The second RX filter may have an output impedance that is matched to an input impedance of the second LNA.

In a second exemplary design, the first active circuit may comprise a first LNA (e.g., LNA 534*a* in FIG. 5) for a first frequency band, and the second active circuit may comprise a second LNA (e.g., LNA 534*b*) for a second frequency band. The first RF filter may comprise a first RX filter (e.g., RX filter 532*a*) for the first frequency band, and the second RF filter may comprise a second RX filter (e.g., RX filter 532*b*) for the second frequency band. A switch (e.g., switch 514) may be coupled to the antenna and the first and second RX filters. In one exemplary design, the switch and the first and second RX filters may be implemented on an RX front-end module (e.g., RX front-end module 520 in FIG. 7), which may be located closer to the first and second LNAs than the antenna. In another exemplary design, the switch, the first and second RX filters, and the first and second LNAs may be implemented on an RX front-end module (e.g., RX front-end module 820 in FIG. 8), which may be located closer to the antenna than other circuits to which the first and second LNAs are coupled.

In a third exemplary design, the first active circuit may comprise a first power amplifier (e.g., power amplifier 546*a* in FIG. 5) for a first frequency band, and the second active circuit may comprise a second power amplifier (e.g., power amplifier 546*b*) for a second frequency band. The first RF filter may comprise a first TX filter (e.g., TX filter 548*a*) for the first frequency band, and the second RF filter may comprise a second TX filter (e.g., TX filter 548*b*) for the second frequency band. A switch (e.g., switch 514) may be coupled to the antenna and the first and second TX filters. In one exemplary design, the switch and the first and second TX filters may be implemented on a TX front-end module (e.g., TX front-end module 522 in FIG. 7), which may be located closer to the antenna than other circuits to which the first and second power amplifiers are coupled.

For the second exemplary design with the first and second active circuits comprising two LNAs, the apparatus may further comprise first and second power amplifiers and first and second TX filters. The first power amplifier (power amplifier 546*a* in FIG. 5) may receive a third input signal and provide a third output signal for the first frequency band. The second power amplifier (e.g., power amplifier 546*b*) may receive a fourth input signal and provide a fourth output signal for the second frequency band. The first TX filter (e.g., TX filter 548*a*) may be for the first frequency band and may be operatively coupled to the antenna and the first power amplifier. The first TX filter may have an input impedance that is matched to an output impedance of the first power amplifier. The second TX filter (e.g., TX filter 548*b*) may be for the second frequency band and may be operatively coupled to the antenna and the second power amplifier. The second TX filter may have an input impedance that is matched to an output impedance of the second power amplifier.

For the second exemplary design with the first and second active circuits comprising two LNAs, the apparatus may further comprise third and fourth LNAs and third and fourth RX filters. The third LNA (e.g., LNA 564*a* in FIG. 6) may receive a third input signal and provide a third output signal for the first frequency band. The fourth LNA (e.g., LNA 564*b*) may receive a fourth input signal and provide a fourth output signal for the second frequency band. The third RX filter (e.g., RX filter 562*a*) may be for the first frequency band and may be operatively coupled to a second/diversity antenna and the third LNA. The third RX filter may have an output impedance that is matched to an input impedance of the third LNA. The fourth RX filter (e.g., RX filter 562*b*) may be for the second frequency band and may be operatively coupled to the second antenna and the fourth LNA. The fourth RX filter may have an output impedance that is matched to an input impedance of the fourth LNA.

In general, the apparatus may include any number of active circuits and any number of RF filters. The active circuits may comprise one or more LNAs, one or more power amplifiers, one or more mixers, etc. The RF filters may comprise one or more RX filters, one or more TX filters, etc. Each pair of active circuit and RF filter may be impedance matched, so that an external impedance matching circuit is not needed between the active circuit and the RF filter.

Figure 9:
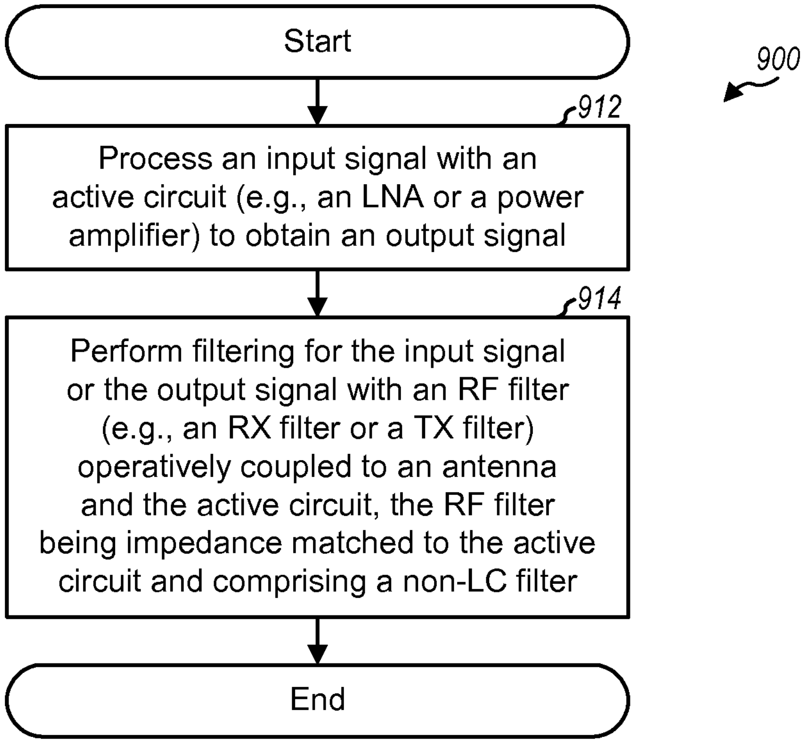
FIG. 9 shows a process for conditioning signals with a Z-matched RF filter.

FIG. 9 shows an exemplary design of a process 900 for processing signals. An input signal may be processed with an active circuit to obtain an output signal (block 912). Filtering for the input signal or the output signal may be performed with an RF filter operatively coupled to an antenna and the active circuit (block 914). The RF filter may be impedance matched to the active circuit and may comprise a non-LC filter.

In an exemplary design of blocks 912 and 914, the input signal may be amplified with an LNA to obtain the output signal. A received signal may be filtered with an RX filter operatively coupled to the antenna and the LNA to obtain the input signal for the LNA. The RX filter may have an output impedance that is matched to an input impedance of the LNA. In another exemplary design of blocks 912 and 914, the input signal may be amplified with a power amplifier to obtain the output signal. The output signal from the power amplifier may be filtered with a TX filter operatively coupled to the antenna and the power amplifier. The TX filter may have an input impedance that is matched to an output impedance of the power amplifier.

The Z-matched RF filters described herein may be implemented on an IC, an analog IC, an RFIC, a mixed-signal IC, an ASIC, a printed circuit board (PCB), an electronic device, etc. The RF filters may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the RF filters described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:

a first active circuit to receive a first input signal and provide a first output signal;

a transmit (TX) radio frequency (RF) filter operatively coupled between an antenna and the first active circuit; and a receive (RX) RF filter operatively coupled between the antenna and a second active circuit, the RX RF filter being located in a separate filter package from the TX RF filter and an input of the RX RF filter directly coupling to an output of the TX RF filter, the separate filter package in a location farther away from the antenna than the TX RF filter and configured only to perform RX RF filtering, the RX RF filter in the separate filter package together with the TX RF filter together configured to perform full-duplexing of RF signals at the antenna.

2. The apparatus of claim 1, the second active circuit comprising a low noise amplifier (LNA), and the RX RF filter having an output impedance matched to an input impedance of the LNA.

3. The apparatus of claim 1, the first active circuit comprising a power amplifier (PA), and the TX RF filter having an input impedance matched to an output impedance of the power amplifier.

4. The apparatus of claim 1, the TX RF filter being coupled directly to the first active circuit with no impedance matching circuit between the first RF filter and the first active circuit.

5. The apparatus of claim 1, wherein the TX and RX RF filters are configured to support operation on at least two frequency bands, or at least two radio technologies, or both, and the first active circuit is configured to support operation on the at least two frequency bands, or the at least two radio technologies, or both.

6. The apparatus of claim 1, the TX RF filter comprising a surface acoustic wave (SAW) filter, a bulk acoustic wave (BAW) filter, a thin film bulk acoustic resonator (FBAR) filter, a micro-electro-mechanical system (MEMS) resonator filter, a cavity resonator filter, or a ceramic filter.

7. The apparatus of claim 1, wherein the apparatus comprises an integrated circuit.

8. The apparatus of claim 1, wherein the second active circuit is configured to receive a second input signal and provide a second output signal; and the RX RF filter is configured to be impedance matched to the second active circuit and comprising a non-LC filter.

9. The apparatus of claim 8, the second active circuit comprising a low noise amplifier (LNA), the first active circuit comprising a power amplifier (PA), the RX RF filter having an output impedance matched to an input impedance of the LNA, and the TX RF filter having an input impedance matched to an output impedance of the power amplifier.

10. The apparatus of claim 9, the RX filter being placed closer to the LNA than the antenna, and the TX filter being placed closer to the power amplifier than the antenna.

11. The apparatus of claim 9, further comprising:

a phase shift circuit coupled between the RX filter and the TX filter.

12. The apparatus of claim 8, the second active circuit comprising a first low noise amplifier (LNA) for a first frequency band, a third active circuit comprising a second LNA for a second frequency band, the RX RF filter for the first frequency band, and a second RX RF filter for the second frequency band.

13. The apparatus of claim 12, further comprising:

a switch coupled to the antenna and the first and second RX filters.

14. The apparatus of claim 13, the switch and the first and second RX filters being implemented on an RX front-end module located closer to the first and second LNAs than the antenna.

15. The apparatus of claim 13, the switch, the first and second RX filters, and the first and second LNAs being implemented on an RX front-end module located closer to the antenna than circuits to which the first and second LNAs are coupled.

16. The apparatus of claim 8, the first active circuit comprising a first power amplifier (PA) for a first frequency band, a third active circuit comprising a second power amplifier for a second frequency band, the TX RF filter for the first frequency band, and a second TX RF filter for the second frequency band.

17. The apparatus of claim 16, further comprising:

a switch coupled to the antenna and the first and second TX filters.

18. The apparatus of claim 17, the switch and the first and second TX filters being implemented on a TX front-end module located closer to the antenna than circuits to which the first and second power amplifiers are coupled.

19. The apparatus of claim 9, further comprising:

a second LNA to receive a third input signal and provide a third output signal; and a second RX filter operatively coupled to a second antenna and the second LNA, the second RX filter having an output impedance matched to an input impedance of the second LNA.

20. The apparatus of claim 12, further comprising:

a first power amplifier (PA) to receive a third input signal and provide a third output signal for the first frequency band;

a second power amplifier to receive a fourth input signal and provide a fourth output signal for the second frequency band; and a second TX RF filter for the second frequency band and operatively coupled to the antenna and the second power amplifier, the second TX RF filter having an input impedance matched to an output impedance of the second power amplifier;

wherein the first TX RF filter is configured for the first frequency band and operatively coupled to the antenna and the first power amplifier, the first TX RF filter configured to have an input impedance matched to an output impedance of the first power amplifier.

21. The apparatus of claim 12, further comprising:

a third LNA to receive a third input signal and provide a third output signal for the first frequency band;

a fourth LNA to receive a fourth input signal and provide a fourth output signal for the second frequency band;

a third RX filter for the first frequency band and operatively coupled to a second antenna and the third LNA, the third RX filter having an output impedance matched to an input impedance of the third LNA; and a fourth RX filter for the second frequency band and operatively coupled to the second antenna and the fourth LNA, the fourth RX filter having an output impedance matched to an input impedance of the fourth LNA.

22. An apparatus comprising:

means for processing a receive signal;

means for processing a transmit signal;

means for performing filtering for the transmit signal, the means for performing filtering for the transmit signal being operatively coupled between an antenna and the means for processing the transmit signal;

means for performing filtering for the receive signal, the means for performing filtering for the receive signal being operatively coupled between the antenna and the means for processing the receive signal, the means for filtering for the receive signal being located in a separate filter package from the means for performing filtering for the transmit signal and an input of the means for filtering for the receive signal directly coupling to an output of the means for performing filtering for the transmit signal;

wherein the means for filtering for the transmit signal is located closer to the antenna than the means for filtering for the receive signal, the means for performing filtering for the receive signal in the separate filter package together with the means for filtering for the transmit signal together configured to perform full-duplexing of RF signals at the antenna.

23. A method comprising:

filtering and impedance matching at a transmit (TX) radio frequency (RF) filter operatively coupled between an antenna and a first active circuit; and filtering and impedance matching at a receive (RX) RF filter operatively coupled between the antenna and a second active circuit, the RX RF filter being located in a separate filter package from the TX RF filter and an input of the RX RF filter directly coupling to an output of the TX RF filter, the separate filter package in a location farther away from the antenna than the TX RF filter and configured only for performing RX RF filtering, the RX RF filter in the separate filter package together with the TX RF filter together configured to perform full-duplexing of RF signals at the antenna.

* * * * *